United States Patent
Roth

(10) Patent No.: US 7,913,922 B1
(45) Date of Patent: Mar. 29, 2011

(54) MATCHING BAR CODE COLORS TO PAINTED PIXEL FILTERS

(75) Inventor: Joseph D Roth, Springboro, OH (US)

(73) Assignee: NCR Corporation, Duluth, GA (US)

(*) Notice: Subject to any disclaimer, the term of this patent is extended or adjusted under 35 U.S.C. 154(b) by 604 days.

(21) Appl. No.: 11/967,237

(22) Filed: Dec. 30, 2007

Related U.S. Application Data

(60) Provisional application No. 60/918,247, filed on Mar. 15, 2007.

(51) Int. Cl.
*G06K 19/06* (2006.01)
(52) U.S. Cl. ............... 235/494; 235/462.25; 235/462.41
(58) Field of Classification Search ............. 235/494, 235/462.25, 462.41
See application file for complete search history.

(56) References Cited

U.S. PATENT DOCUMENTS

| | | | |
|---|---|---|---|
| 3,971,065 A | 7/1976 | Bayer | |
| 4,323,772 A * | 4/1982 | Serge | 235/462.19 |
| 4,958,064 A * | 9/1990 | Kirkpatrick | 235/384 |
| 5,369,261 A | 11/1994 | Shamir | |
| 5,682,030 A * | 10/1997 | Kubon | 235/462.25 |
| 5,714,745 A * | 2/1998 | Ju et al. | 235/469 |
| 6,832,729 B1 * | 12/2004 | Perry et al. | 235/472.01 |
| 6,902,113 B2 | 6/2005 | Sali | |
| 7,063,260 B2 | 6/2006 | Mossberg | |
| 7,118,041 B2 | 10/2006 | Taylor | |
| 7,138,663 B2 | 11/2006 | Hoshuyama | |
| 7,210,631 B2 | 5/2007 | Sali | |
| 2003/0052178 A1 * | 3/2003 | Zeller et al. | 235/494 |
| 2005/0231618 A1 | 10/2005 | Sugiyama | |
| 2006/0219791 A1 | 10/2006 | Mossberg | |
| 2007/0024879 A1 | 2/2007 | Hamilton | |
| 2007/0032869 A1 * | 2/2007 | Gilliard et al. | 623/6.62 |
| 2007/0145273 A1 | 6/2007 | Chang | |
| 2009/0045259 A1 * | 2/2009 | Ehrhart et al. | 235/462.08 |
| 2009/0148044 A1 * | 6/2009 | Epshteyn | 382/183 |

OTHER PUBLICATIONS

Restriction Requirement for U.S. Appl. No. 11/967,238 (same specification and claims as U.S. Appl. No. 11/967,237) mailed Aug. 11, 2010.
Noble, Stephen A., "The Technology Inside the New Kodak Professional DCS 620x Digital Camera".
Various, "Bayer Filter", http://en.wikipedia.org/wiki/Bayer_filter, (Sep. 25, 2010).

* cited by examiner

*Primary Examiner* — Allyson N Trail
(74) *Attorney, Agent, or Firm* — Robert S. Chee

(57) ABSTRACT

A bar code includes a plurality of bar code elements arranged in an information-conveying arrangement. Each bar code element has a color selected from one of a group of colors in a painted pixel filter associated with a camera that will be used to read the bar code.

33 Claims, 5 Drawing Sheets

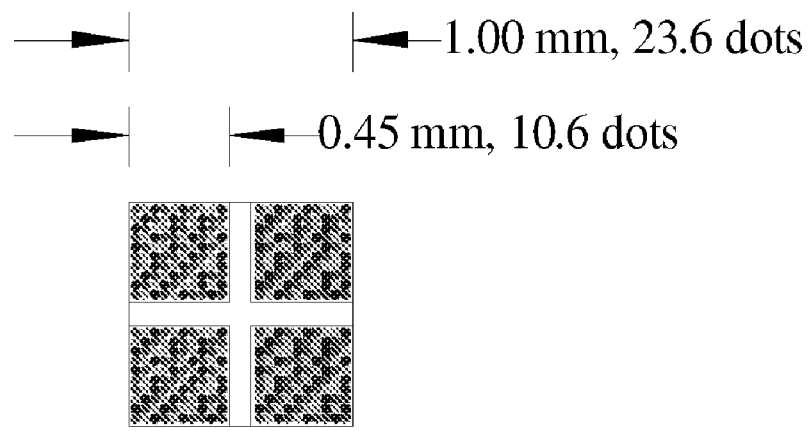
FIG. 7
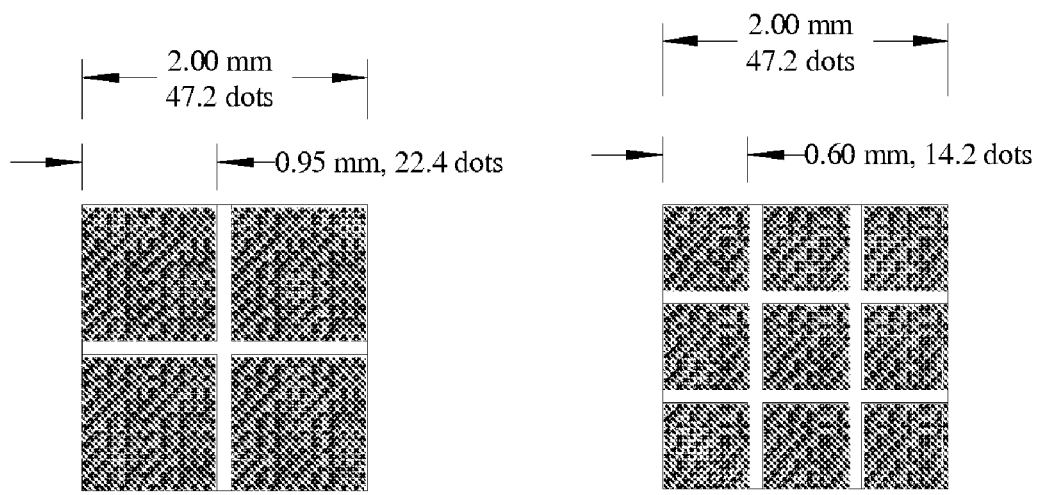
FIG. 8     FIG. 9

MATCHING BAR CODE COLORS TO PAINTED PIXEL FILTERS

This application claims priority from U.S. Provisional Application 60/918,247 which was filed on Mar. 15, 2007.

BACKGROUND

Bar codes may be attached to or printed on an object and then used to identify the object. Bar codes can be black and white or they can include color. Bar codes can be one dimensional or two dimensional. Bar codes are sometimes referred to as "spatial codes."

Cameras may be used to read bar codes. A color camera may be used to read color bar codes. Color cameras typically include a large number of photosensors arranged in an array. Color cameras typically include a painted pixel filter, such as the filter mosaic 24 in U.S. Pat. No. 3,971,065, which "includes individual filters (e.g., filter 26) in one-to-one registration with individual sensor elements of the array (e.g., the element 22)." Column 4, lines 54-58. In U.S. Pat. No. 3,971,065, the painted pixel filter is of the "selective transmitting type," such that each individual filter allows light of a particular range of colors to pass through. The painted pixel filter is typically arranged over the color camera's photosensor array such that each individual photosensor receives one of the color ranges that the painted pixel filter passes.

Painted pixel filters have filters in several colors arranged in a pattern. The color combinations typically provided in commercially available color cameras include RGB (Red, Green, Blue), RGBE (Red, Green, Blue, Emerald), and CYM (Cyan, Magenta, Yellow), among others. The "Bayer pattern" of U.S. Pat. No. 3,971,065 describes an arrangement of RGB filters.

Accurately reading color bar codes with commercially available color cameras is a challenge.

SUMMARY

In general, in one aspect, the invention features a bar code. The bar code includes a plurality of bar code elements arranged in an information-conveying arrangement. Each bar code element has a color selected from one of a group of colors in a painted pixel filter associated with a camera that will be used to read the bar code.

Implementations of the invention may include one or more of the following. The painted pixel filter may include a Bayer filter pattern. The colors of the painted pixel filter may be selected from a group consisting of RGB colors, RGBE colors, and CYM colors. The bar code elements may be printed with fluorescent ink. A first set of bar code elements of the plurality of bar code elements may be intermixed with a second set of bar code elements of the plurality of bar code elements. The first set of bar code elements may be printed in a first color of the group of colors. The second set of bar code elements may be printed in a second color of the group of colors. The first set of bar code elements may be readable as a complete bar code. The second set of bar code elements may be readable as a complete bar code. The bar code may include a finder pattern. The bar code may include a locator pattern. Each bar code element may have N colors, each of the colors being in one of F fractional intensity levels. One of the bar code elements may have N colors, each of the colors being in one of F fractional intensity levels, where the F fractional intensity levels are substantially evenly spaced between 0 and M. One bar code element may have one of a total of $F^N$ color combinations, each color combination comprising N colors, each of the colors being in one of F fractional intensity levels. $(F-1)^N$ color combinations of the total $F^N$ color combinations may not be used. One bar code element may have one of a total of $F^N$ color combinations, each color combination comprising N colors, each of the colors being in one of F fractional intensity levels. The bar code may include an intensity standard whereby the fractional intensity levels can be distinguished. 1 color combination of the total $F^N$ color combinations may not be used.

In general, in another aspect, the invention features a method for creating bar codes. The method includes arranging bar code elements in an information-conveying arrangement. Each bar code element has a color selected from one of a group of colors in a painted pixel filter associated with a camera that will be used to read the bar code.

In general, in another aspect, the invention features a bar code reading system. The bar code reading system includes a camera system having a plurality of groups of sensors. Each group of sensors is sensitive to light in one of a plurality of colors in a painted pixel filter. The camera system produces a sensor group signal for each of the plurality of groups of sensors. The bar code reading system includes a processing system coupled to the camera system to receive the sensor group signals. The processing system detects bar code elements in each of the sensor group signals that are independent of the bar code elements in the other sensor group signals.

BRIEF DESCRIPTION OF THE DRAWINGS

FIGS. 7-9 illustrate dots in patches of color.

DETAILED DESCRIPTION

Figure 1:
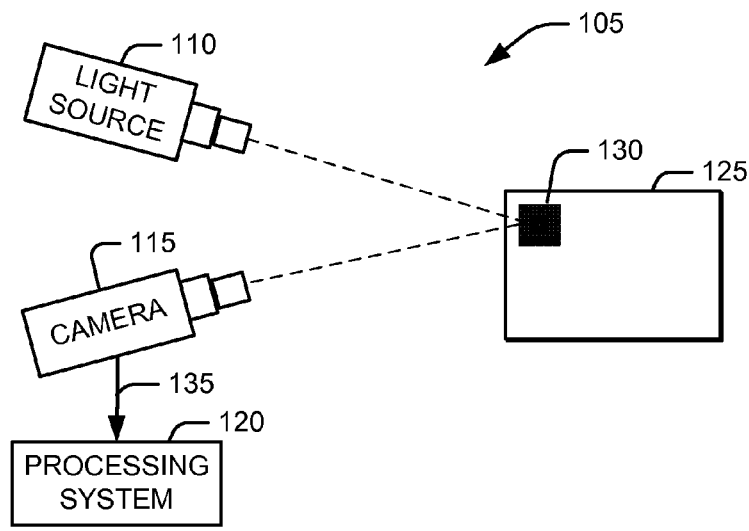
FIG. 1 illustrates a bar code reading system.

One embodiment of a bar code reading system 105, illustrated in FIG. 1, includes a light source 110, a camera 115, and a processing system 120. The light source 110 illuminates an object 125 that includes a bar code 130. In one embodiment, the light source 110 is an ultraviolet light. The camera 115 receives light reflected from the bar code 130, as indicated by the dotted line, and detects it. The camera 115 produces signals 135 which represent the image that it detects. The processing system 120 processes the signals 135 to, for example, identify the object 125.

In one embodiment, the bar code 130 is a color bar code and the camera 115 is a color camera. Color bar codes allow the information density of spatial codes to be increased. By using color, information can be encoded both spatially and by using the color of the bar code elements. The increased information density allows color bar codes to be attached to very small items.

For example, consider one embodiment, in which a small, e.g. 2×2 mm, item is marked using a 3 color inkjet printer and it is desired to read the mark using bar code reading system 105 in which the camera 115 is a color camera with a RGB painted pixel filter.

In one embodiment, the inks are chosen so that they match the RGB painted pixel filter, i.e., such that the red ink is sensed only by the camera's red pixels, the green ink is sensed only by the green pixels, and the blue ink is sensed only by the blue pixels. The term "red pixel" refers to the camera's photosensors that are arranged relative to the painted pixel filter such that they receive only light only in the red range. The terms "green pixel" and "blue pixel" are defined similarly. Note that red pixels also receive light of other colors but in typical use the level of light from outside the red range is below a threshold level and does not interfere substantially with the detection of light in the red range. The same is true of green pixels and blue pixels.

Figure 2:
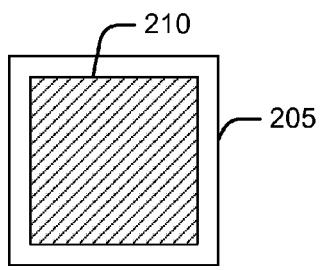
FIG. 2 illustrates a single patch of color on an object.

If the entire surface of the item 205 is covered by a single spot 210, as shown in FIG. 2, 7 distinct color combinations can be differentiated, as shown in Table 1 below:

TABLE 1

| R | G | B |
|---|---|---|
| 1 | 1 | 1 |
| 1 | 1 | 0 |
| 1 | 0 | 1 |
| 0 | 1 | 1 |
| 1 | 0 | 0 |
| 0 | 1 | 0 |
| 0 | 0 | 1 |

Figure 3:
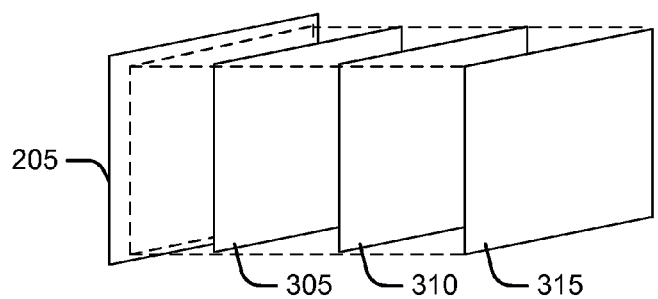
FIG. 3 illustrates three overlaid patches of color.

Table 1 shows the level of ink applied to the item. "R" refers to red; "G" to green; and "B" to blue. A "1" in a column represents full coverage of the ink. A "0" in the column indicates that no ink was applied. "0, 0, 0" was intentionally omitted from the table. A "1" in more than one column indicates that more than one color ink was printed and that one layer was printed on top of another. For example, as shown in FIG. 3, a red patch 305 may be overlaid by a green patch 310 that may be overlaid by a blue patch 315. In one embodiment, the mixture of colors is formed, not by overlaying color patches, but by arranging tiny dots corresponding to the primary colors (e.g., red, green, and blue) in close proximity to each other. The camera 115 mixes the colors in the dots much as the eye does. In another embodiment, a computer program mixes colors to simulate the overlaying of single color bar codes prior to sending the resulting bar code to a color printer for printing.

Figure 4:
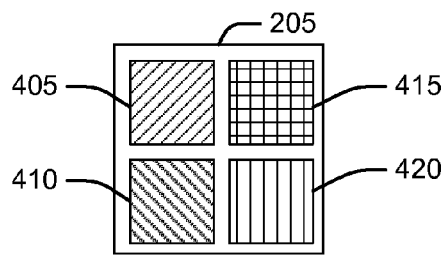
FIG. 4 illustrates a plurality of patches of color on an object.

The amount of information can be increased by printing 4 distinct patches of ink, 405, 410, 415, 420, as shown in FIG. 4. Each patch can be considered a digit in a 4 digit number. The colors each represent a possible value in each digit of the 4 digit number. If inks are chosen to match the RGB painted pixel filter, FIG. 4 represents a base 7, four digit number, which results in $7^4$ unique codes. The number of unique codes increases as the number of spots (or digits) increases, as shown in Table 2:

TABLE 2

| Number of Digits | Number of Color Combinations | Number of Unique Codes |
|---|---|---|
| 1 | 7 | 7 |
| 4 | 7 | $2.4 \times 10^3$ ($7^4$) |
| 9 | 7 | $4.0 \times 10^7$ ($7^9$) |

TABLE 2-continued

| Number of Digits | Number of Color Combinations | Number of Unique Codes |
|---|---|---|
| 16 | 7 | $3.3 \times 10^{13}$ ($7^{16}$) |

The number of color combinations, and thus the number of unique codes, can be further increased by printing fractional values of each color. Assign "1" as the maximum amount of ink that can be deposited in a spot by the printer. Assign "0" as no ink applied in a spot by a printer. Assign "0.5" as ½ the volume of the amount of ink deposited with "1." The number of color combinations increases to 19, as shown in Table 3:

TABLE 3

| R | G | B |
|---|---|---|
| 1 | 1 | 1 |
| 1 | 1 | 0.5 |
| 1 | 0.5 | 1 |
| 0.5 | 1 | 1 |
| 1 | 1 | 0 |
| 1 | 0.5 | 0.5 |
| 1 | 0 | 1 |
| 0.5 | 1 | 0.5 |
| 0.5 | 0.5 | 1 |
| 0 | 1 | 1 |
| 1 | 0.5 | 0 |
| 1 | 0 | 0.5 |
| 0.5 | 1 | 0 |
| 0.5 | 0 | 1 |
| 0 | 1 | 0.5 |
| 0 | 0.5 | 1 |
| 1 | 0 | 0 |
| 0 | 1 | 0 |
| 0 | 0 | 1 |

Once again, the information in the bar code can be increased by printing distinct patches of ink. The result is a base 19 number with the number of digits being equal to the number of color patches. The number of unique codes increases quickly as the number of spots (digits) increases, as shown in Table 4:

TABLE 4

| Number of Digits | Number of Color Combinations | Number of Unique Codes |
|---|---|---|
| 1 | 19 | 19 |
| 4 | 19 | $1.3 \times 10^5$ ($19^4$) |
| 9 | 19 | $3.2 \times 10^{11}$ ($19^9$) |
| 16 | 19 | $2.9 \times 10^{20}$ ($19^{16}$) |

The number of color combinations available increases to 61 in a system that has five fractional values or fractional color intensity levels (0, 0.25, 0.5, 0.75, and 1), as shown in Table 5.

TABLE 5

| R | G | B | R | G | B |
|---|---|---|---|---|---|
| 1 | 1 | 1 | 0 | 1 | 1 |
| 1 | 1 | 0.75 | 1 | 0.75 | 0 |
| 1 | 0.75 | 1 | 1 | 0.5 | 0.25 |
| 0.75 | 1 | 1 | 1 | 0.25 | 0.5 |
| 1 | 1 | 0.5 | 1 | 0 | 0.75 |

TABLE 5-continued

| R | G | B | R | G | B |
|---|---|---|---|---|---|
| 1 | 0.75 | 0.75 | 0.75 | 1 | 0 |
| 1 | 0.5 | 1 | 0.75 | 0 | 1 |
| 0.75 | 1 | 0.75 | 0.5 | 1 | 0.25 |
| 0.75 | 0.75 | 1 | 0.5 | 0.25 | 1 |
| 0.5 | 1 | 1 | 0.25 | 1 | 0.5 |
| 1 | 1 | 0.25 | 0.25 | 0.5 | 1 |
| 1 | 0.75 | 0.5 | 0 | 1 | 0.75 |
| 1 | 0.5 | 0.75 | 0 | 0.75 | 1 |
| 1 | 0.25 | 1 | 1 | 0.5 | 0 |
| 0.75 | 1 | 0.5 | 1 | 0.25 | 0.25 |
| 0.75 | 0.5 | 1 | 1 | 0 | 0.5 |
| 0.5 | 1 | 0.75 | 0.5 | 1 | 0 |
| 0.5 | 0.75 | 1 | 0.5 | 0 | 1 |
| 0.25 | 1 | 1 | 0.25 | 1 | 0.25 |
| 1 | 1 | 0 | 0.25 | 0.25 | 1 |
| 1 | 0.75 | 0.25 | 0 | 1 | 0.5 |
| 1 | 0.5 | 0.5 | 0 | 0.5 | 1 |
| 1 | 0.25 | 0.75 | 1 | 0.25 | 0 |
| 1 | 0 | 1 | 1 | 0 | 0.25 |
| 0.75 | 1 | 0.25 | 0.25 | 1 | 0 |
| 0.75 | 0.25 | 1 | 0.25 | 0 | 1 |
| 0.5 | 1 | 0.5 | 0 | 1 | 0.25 |
| 0.5 | 0.5 | 1 | 0 | 0.25 | 1 |
| 0.25 | 1 | 0.75 | 1 | 0 | 0 |
| 0.25 | 0.75 | 1 | 0 | 1 | 0 |

The number of unique codes increases as the number of spots (i.e. digits) increases, as shown in Table 6:

TABLE 6

| # Digits | # Color Combinations | # Unique Codes |
|---|---|---|
| 1 | 61 | 61 |
| 4 | 61 | $1.38 \times 10^7$ ($61^4$) |
| 9 | 61 | $1.17 \times 10^{16}$ ($61^9$) |
| 16 | 61 | $3.68 \times 10^{28}$ ($61^{16}$) |

Further, in the examples shown in FIGS. 2 and 4, the patches are square and they are arranged in square patterns. Many geometrical variations, both in the shape of the patches and their arrangement, are possible.

As mentioned above, commercially available color cameras include other painted pixel filters. For example, color cameras using CMY painted pixel filters are available. The same principles would apply to such cameras.

Color cameras with 4-color painted pixel filters, such as RGBE, are also commercially available. Having 4 color filters increases the number of distinguishable colors, which increases the number of codes as compared to a camera with 3-color painted pixel filters, as shown in Table 7 and Table 8:

TABLE 7

| Number of Fractional Color Intensity Levels | Num of Color Combinations | 1 Patch of ink | 4 Patches of ink | 9 Patches of ink | 16 Patches of ink |
|---|---|---|---|---|---|
| 2 | 7 | 7 | 2.40E + 03 | 4.04E + 07 | 3.32E + 13 |
| 3 | 19 | 19 | 1.30E + 05 | 3.23E + 11 | 2.88E + 20 |
| 5 | 61 | 61 | 1.38E + 07 | 1.17E + 16 | 3.68E + 28 |
| 6 | 91 | 91 | 6.86E + 07 | 4.28E + 17 | 2.21E + 31 |

TABLE 8

| Number of Fractional Color Intensity Levels | Number of Color Combinations | 1 Patch of ink | 4 Patches of ink | 9 Patches of ink | 16 Patches of ink |
|---|---|---|---|---|---|
| 2 | 15 | 15 | 5.06E + 04 | 3.84E + 10 | 6.57E + 18 |
| 3 | 65 | 65 | 1.79E + 07 | 2.07E + 16 | 1.02E + 29 |
| 5 | 369 | 369 | 1.85E + 10 | 1.27E + 23 | 1.18E + 41 |
| 6 | 671 | 671 | 2.03E + 11 | 2.76E + 25 | 1.69E + 45 |

In one embodiment, the camera 115 includes a custom painted picture filter that is designed to match a specific set of ink colors. This increases the number of colors in the painted pixel filter, which increases the number of codes.

In one embodiment, the camera 115 is a multi-chip camera, with three of photosensor chips. Each photosensor chip has a different color filter, typically one of the RGB colors. With such a camera, interpolation of the image is not required and the image has higher resolution.

Figure 5:
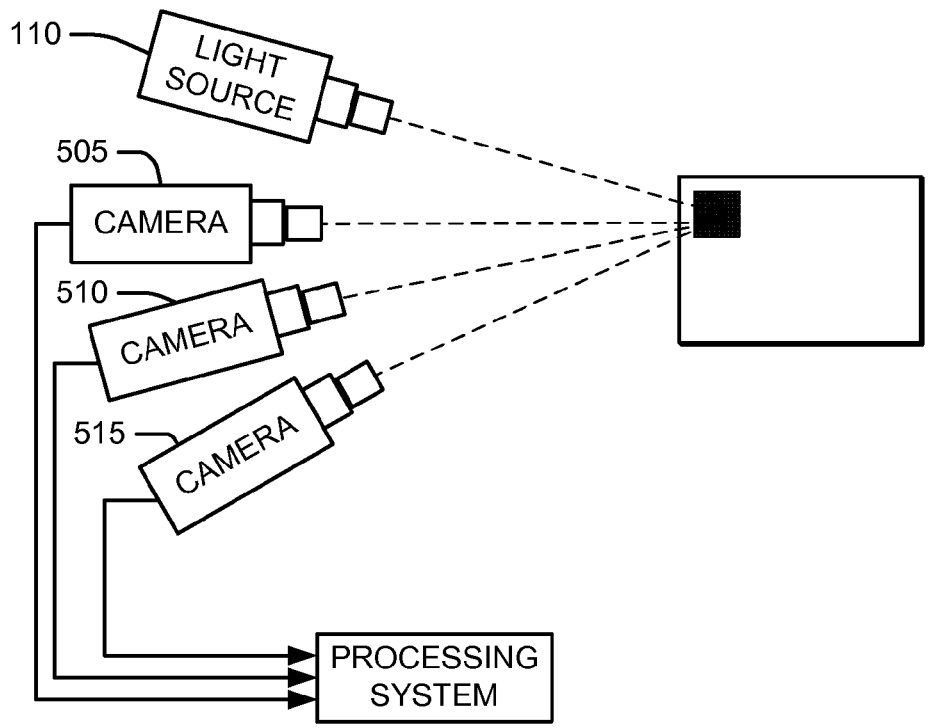
FIG. 5 illustrates a bar code reading system with multiple cameras.

In one embodiment, shown in FIG. 5, multiple cameras, e.g. cameras 505, 515, and 520, are aligned to a single area. In one embodiment, each of the cameras 505, 515, and 520 has a different painted pixel filter.

Figure 6:
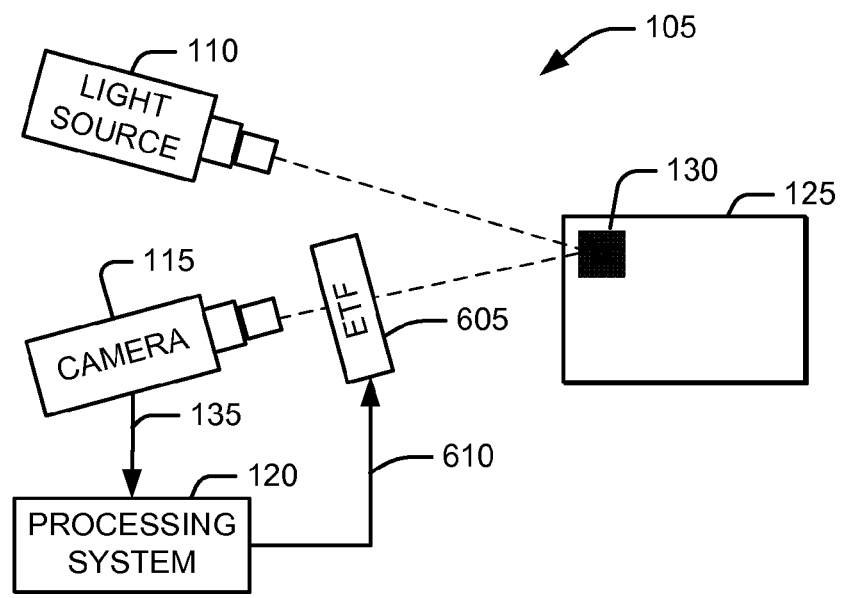
FIG. 6 illustrates a bar code reading system incorporating an electronically tunable filter.

In one embodiment, shown in FIG. 6, an electronically tunable filter ("ETF") 605 is inserted in front of the camera 115. An ETF is a device whose spectral transmission can be electronically controlled. In FIG. 6, the control is provided by the processing system 120 through signals 610. The control can be via applied voltage or acoustic signal. The ETF has no moving parts. Typically, the transmission band of the ETF can be changed in less than 100 ms.

There are a number of commercially-available ETFs: (a) liquid crystal tunable filters (LCTF); (b) acousto-optical tunable filters (AOTF); and (c) Fabry-Perot devices.

The ETF can be used to take a plurality of pictures of the bar code 130, each picture being taken in a different frequency range. This allows a variety of photoluminescent compounds to be used to construct the color levels. In addition, it would be difficult for a counterfeiter to know what frequency bands are being interrogated by examining the bar code 130.

In one embodiment, the bar code includes quantum dots (i.e., tiny spheres impregnated with a photoluminescent material) and an ETF is employed, resulting in a large number of codes in a small area.

In one embodiment, the light source 110 is a source of white light and the bar code 130 uses visible colors. The photoluminescent embodiments with fluorescent inks use additive color. In contrast, the visible color embodiment uses subtractive colors. Thus, while the photoluminescent embodiments use a dark background behind the bar code 130 and add the RGB color, the visible color embodiments use a white background and subtract the RGB color.

The number of dots in typical patches of color printed by a 600 dot per inch printer is illustrated in FIGS. 7-9. FIG. 7 shows a 1 mm square divided into 4 sections. FIG. 8 shows a 2 mm square divided into 4 sections. FIG. 9 shows a 2 mm square divided into 9 sections.

Figure 10:
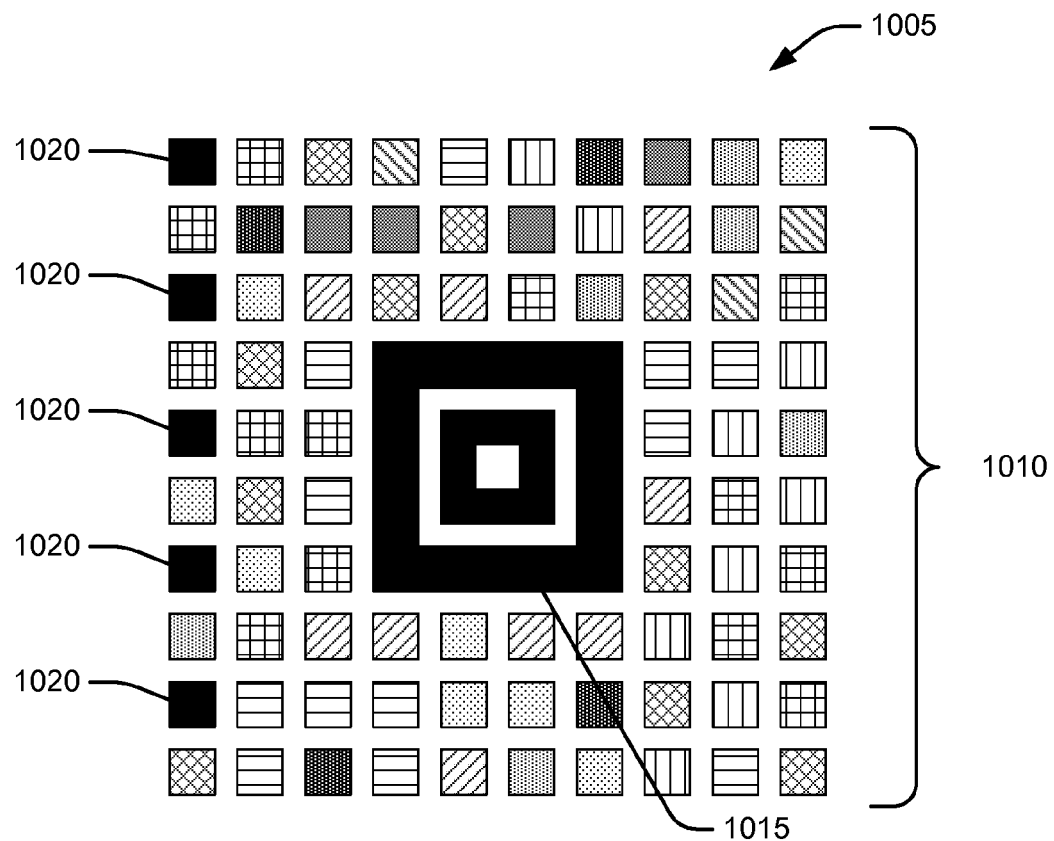
FIG. 10 illustrates a bar code including a finder pattern and a locator pattern.
Figure 11:
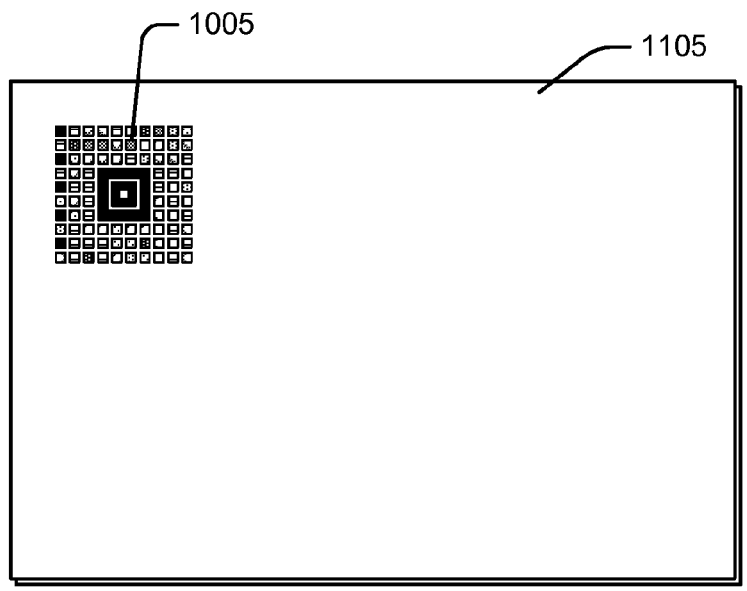
FIG. 11 illustrates a bar code affixed to or printed on an object.

In one embodiment, a bar code 1005, illustrated in FIG. 10, is made up of patches of color 1010 such as those shown in FIGS. 7-9. The bar code 1005 includes a finder pattern 1015 and a locator pattern 1020. In one embodiment, the finder pattern 1015 is used to locate the bar code 1005. In one embodiment, the locator pattern 1020 is used to detect the orientation of the bar code 1005, for example by finding the leftmost edge, as in FIG. 10. In one embodiment, the finder pattern 1015 and the locator pattern 1020 are the same thing. The bar code 1005 can be affixed to or printed on an object 1105, as shown in FIG. 11.

Figure 12:
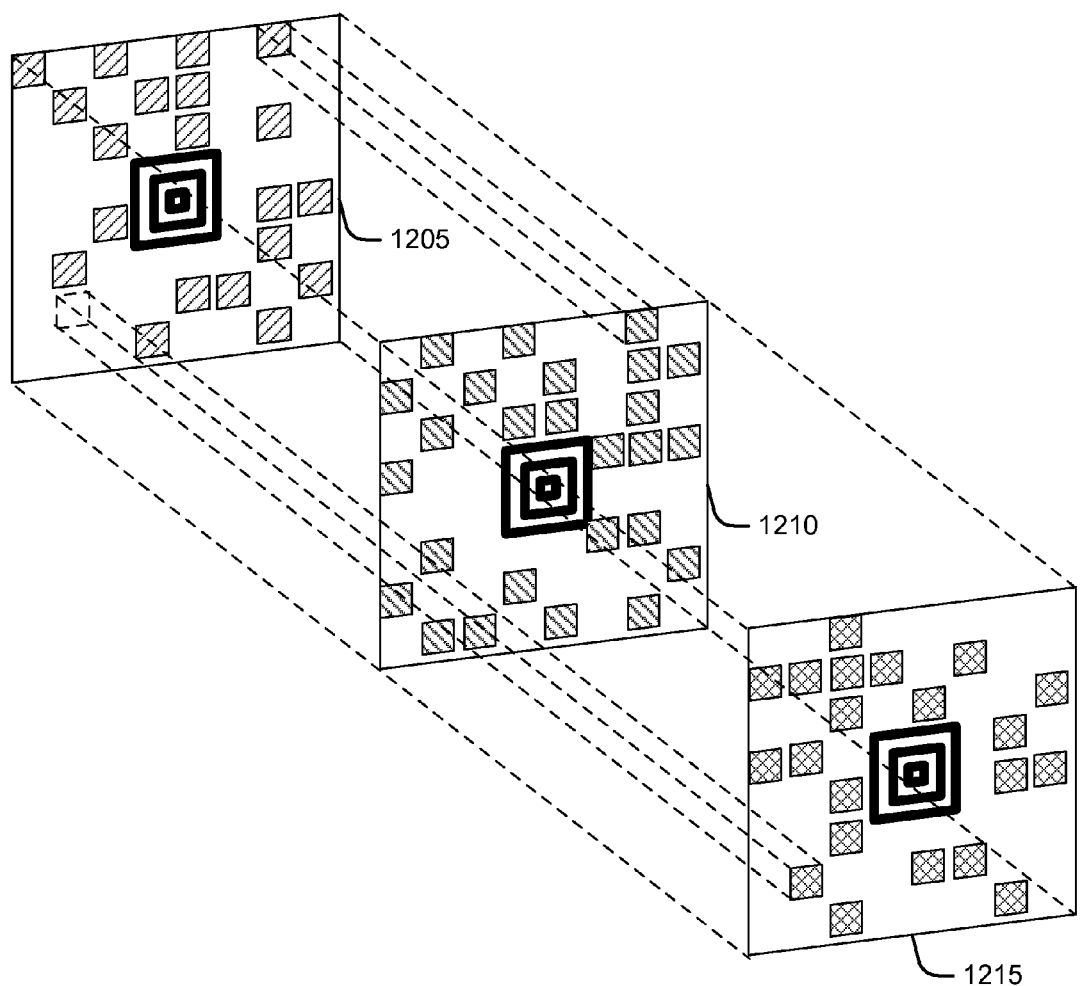
FIG. 12 illustrates a bar code with multiple layers.

In one embodiment, the bar code 1005 can include a plurality of layers 1205, 1210, and 1215, printed one on top of another, as shown in FIG. 12. The patches in each of the layers 1205, 1210, and 1215 can have different characteristics. In one embodiment, each of the layers 1205, 1210, and 1215 can be read as a separate bar code. In one embodiment, all of the layers 1205, 1210, and 1215 must be read to interpret the bar code 1005.

Note that in Tables 3 and 5, not all possible codes are present. This is because, for example, the codes (1, 1, 1), (0.75, 0.75, 0.75), (0.5, 0.5, 0.5) and (0.25, 0.25, 0.25) appear the same unless the bar code contains an intensity standard that the bar code reading system 105 can use as a reference by which it can distinguish the intensity of 1 from the other intensities. For this reason, codes that do not contain the value 1 (i.e., (1, X, X), (X, 1, X) and (X, X, 1), where X means "don't care") are not used in systems that do not have an intensity standard. For a bar code with N different colors and F intensity levels for each color, that rule eliminates $(F-1)^N$ codes. That means that the total number of codes available in such a bar code is:

$$F^N - (F-1)^N$$

If an intensity reference is available, the total number of available codes in a bar code is:

$$F^N - 1$$

"1" is subtracted because the (0, 0, 0) code is not available. In one embodiment, the finder pattern 1015 shown in FIG. 10 is used as an intensity standard. In one embodiment, the locator pattern 1020 shown in FIG. 10 is used as an intensity standard. The finder pattern 1015 and locator pattern 1020 can serve as intensity standards because they can be fixed in intensity from one bar code to another.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A bar code comprising:
   a plurality of bar code elements arranged in an information-conveying arrangement;
   each bar code element having a color selected from one of a group of colors in a painted pixel filter associated with a camera that will be used to read the bar code; and
   at least one of the plurality of bar code elements having N colors, each of the colors being in one of F fractional intensity levels.

2. The bar code of claim 1 wherein:
   the painted pixel filter includes a Bayer filter pattern.

3. The bar code of claim 1 wherein:
   the colors of the painted pixel filter are selected from a group consisting of RGB colors, RGBE colors, and CYM colors.

4. The bar code of claim 1 wherein
   the bar code elements are printed with fluorescent ink.

5. The bar code of claim 1 wherein:
   a first set of bar code elements of the plurality of bar code elements is intermixed with a second set of bar code elements of the plurality of bar code elements;
   the first set of bar code elements is printed in a first color of the group of colors; and
   the second set of bar code elements is printed in a second color of the group of colors.

6. The bar code of claim 5 wherein:
   the first set of bar code elements is readable as a complete bar code; and
   the second set of bar code elements is readable as a complete bar code.

7. The bar code of claim 1 further comprising:
   a finder pattern.

8. The bar code of claim 1 further comprising:
   a locator pattern.

9. The bar code of claim 1 wherein the F fractional intensity levels are substantially evenly spaced between 0 and M.

10. The bar code of claim 1 wherein:
    one bar code element has one of a total of $F^N$ color combinations, each color combination comprising N colors, each of the colors being in one of F fractional intensity levels; and
    wherein $(F-1)^N$ color combinations of the total $F^N$ color combinations are not used.

11. The bar code of claim 1 wherein:
    one bar code element has one of a total of $F^N$ color combinations, each color combination comprising N colors, each of the colors being in one of F fractional intensity levels; and
    the bar code includes an intensity standard whereby the fractional intensity levels can be distinguished; and
    wherein 1 color combination of the total $F^N$ color combinations are not used.

12. A method for creating bar codes comprising:
    arranging bar code elements in an information-conveying arrangement;
    each bar code element having a color selected from one of a group of colors in a painted pixel filter associated with a camera that will be used to read the bar code, wherein at least one of the plurality of bar code elements having N colors, each of the colors being in one of F fractional intensity levels.

13. The method of claim 12 wherein:
    the painted pixel filter includes a Bayer filter pattern.

14. The method of claim 12 wherein:
    the colors of the painted pixel filter are selected from a group consisting of RGB colors, RGBE colors, and CYM colors.

15. The method of claim 12 further comprising:
    printing the bar code elements with fluorescent ink.

16. The method of claim 12 further comprising:
    intermixing a first set of bar code elements of the plurality of bar code elements with a second set of bar code elements of the plurality of bar code elements;
    printing the first set of bar code elements in a first color of the group of colors; and
    printing the second set of bar code elements in a second color of the group of colors.

17. The method of claim 16 wherein:
    the first set of bar code elements is readable as a complete bar code; and
    the second set of bar code elements is readable as a complete bar code.

18. The method of claim 12 further comprising:
    including a finder pattern.

19. The method of claim 12 further comprising:
    including a locator pattern.

20. The method of claim 12 wherein
the F fractional intensity levels are substantially evenly spaced between 0 and M.

21. The method of claim 12 wherein:
one bar code element has one of a total of $F^N$ color combinations, each color combination comprising N colors, each of the colors being in one of F fractional intensity levels; and
wherein $(F-1)^N$ color combinations of the total $F^N$ color combinations are not used.

22. The method of claim 12 wherein:
one bar code element has one of a total of $F^N$ color combinations, each color combination comprising N colors, each of the colors being in one of F fractional intensity levels; and
the bar code includes an intensity standard whereby the fractional intensity levels can be distinguished; and
wherein 1 color combination of the total $F^N$ color combinations are not used.

23. A bar code reading system, comprising:
a camera system having a plurality of groups of sensors;
each group of sensors being sensitive to light in one of a plurality of colors in a painted pixel filter,
the camera system to produce a sensor group signal for each of the plurality of groups of sensors;
a processing system coupled to the camera system to receive the sensor group signals;
the processing system to detect bar code elements in each of the sensor group signals that are independent of the bar code elements in the other sensor group signals; and
at least one of the plurality of bar code elements having N colors, each of the colors being in one of F fractional intensity levels.

24. The bar code reading system of claim 23 wherein:
the painted pixel filter includes a Bayer filter pattern.

25. The bar code reading system of claim 23 wherein:
the colors of the painted pixel filter are selected from a group consisting of RGB colors, RGBE colors, and CYM colors.

26. The bar code reading system of claim 23 further comprising:
the processing system to detect a separate bar code in the bar code elements detected in one of the sensor group signals.

27. The bar code reading system of claim 23 further comprising:
the processing system to detect a finder code in the sensor group signals.

28. The bar code reading system of claim 23 further comprising:
the processing system to detect a locator code in the sensor group signals.

29. The bar code reading system of claim 23 further comprising:
a light source to cause a bar code printed using fluorescent ink to radiate in the plurality of colors in the painted pixel filter.

30. The bar code reading system of claim 23 further comprising:
a light source tunable to cause a bar code to radiate in a subset of the plurality of colors in the painted pixel filter.

31. The bar code reading system of claim 23 wherein
the F fractional intensity levels are substantially evenly spaced between 0 and M.

32. The bar code reading system of claim 23 wherein:
one bar code element has one of a total of $F^N$ color combinations, each color combination comprising N colors, each of the colors being in one of F fractional intensity levels; and
wherein $(F-1)^N$ color combinations of the total $F^N$ color combinations are not used.

33. The bar code reading system of claim 23 wherein:
one bar code element has one of a total of $F^N$ color combinations, each color combination comprising N colors, each of the colors being in one of F fractional intensity levels; and
the bar code includes an intensity standard whereby the fractional intensity levels can be distinguished; and
wherein 1 color combination of the total $F^N$ color combinations are not used.

* * * * *